(12) United States Patent
Berton

(10) Patent No.: US 12,026,035 B2
(45) Date of Patent: Jul. 2, 2024

(54) COMPUTING SYSTEM AND METHOD FOR ADJUSTING VOLTAGE REGULATION

(71) Applicant: BULL SAS, Les Clayes-sous-Bois (FR)

(72) Inventor: Damien Berton, Saint Cyr l'Ecole (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 17/957,021

(22) Filed: Sep. 30, 2022

(65) Prior Publication Data

US 2023/0098209 A1    Mar. 30, 2023

(30) Foreign Application Priority Data

Sep. 30, 2021   (EP) ..................................... 21306355

(51) Int. Cl.
*G06F 1/3296* (2019.01)
*G06F 1/26* (2006.01)
*G06F 1/3228* (2019.01)

(52) U.S. Cl.
CPC .......... *G06F 1/3296* (2013.01); *G06F 1/3228* (2013.01); *G06F 1/26* (2013.01); *Y02D 10/00* (2018.01)

(58) Field of Classification Search
CPC ........ G06F 1/26; G06F 1/3228; G06F 1/3296; Y02D 10/00
See application file for complete search history.

(56) References Cited

U.S. PATENT DOCUMENTS

| | | | | |
|---|---|---|---|---|
| 6,697,952 B1 * | 2/2004 | King | .......................... | G06F 1/26 713/340 |
| 7,421,604 B1 * | 9/2008 | Mimberg | .................. | G06F 1/26 713/340 |
| 2015/0309559 A1 * | 10/2015 | Jacobson | .............. | G06F 15/177 713/330 |
| 2020/0050920 A1 | 2/2020 | Idgunji et al. | | |

FOREIGN PATENT DOCUMENTS

WO    2019032207 A1    2/2019

OTHER PUBLICATIONS

European Search Report issued in EP21306355.5 dated Mar. 30, 2022 (8 pages).

* cited by examiner

*Primary Examiner* — Terrell S Johnson
(74) *Attorney, Agent, or Firm* — ARC IP Law, PC; Joseph J. Mayo

(57) ABSTRACT

A computing system for adjusting voltage regulation including a main processing module, a secondary processing module that executes requested computation tasks, and a voltage regulation module connected to the secondary processing module that regulates its output voltage according to a regulation law depending on at least one regulation parameter. The system also includes a first digital bus that transfers requested computation tasks from the main processing module to the secondary processing module and transfers results of the requested computation tasks from the secondary processing module to the main processing module. The (Continued)

system also includes a second digital bus that transfers regulation parameters from the main processing module to the voltage regulation module.

8 Claims, 2 Drawing Sheets

COMPUTING SYSTEM AND METHOD FOR ADJUSTING VOLTAGE REGULATION

This application claims priority to European Patent Application Number 21306355.5, filed 30 Sep. 2021, the specification of which is hereby incorporated herein by reference.

BACKGROUND OF THE INVENTION

Field of the Invention

The technical field of the invention is the one of computing systems and more particularly of computing systems with an adjusted voltage regulation.

Embodiments of the invention relate to a computing system for adjusting the regulation of the voltage supplied to a secondary processing module executing computation tasks on request of a main processing module. Embodiments also relate to a method implemented by the computing system.

Description of the Related Art

Accelerators are processing units with specific internal architectures dedicated to the execution of specialized requested computation tasks. Most common accelerators are Field-Programmable Gate Arrays (FPGA), Application-Specific Integrated Circuits (ASIC) or Graphics Processing Units (GPU).

An acceleration computing system, that is a computing system comprising an accelerator, further requires a main processing unit that provides the requested computation tasks to the accelerator, and a voltage regulation unit supplying electricity to the accelerator.

Today, the voltage regulators implemented in acceleration computing systems are set up to supply current to the accelerator according to a regulation law. The regulation law indicates how the voltage at the output of the voltage regulator should be changed in order to supply a desired current, the voltage having to be comprised between a maximum voltage bound and a minimum voltage bound and the regulation law being defined based on a maximum current limit. The maximum voltage bound, the minimum voltage bound and the maximum current limit are imposed by the accelerator supplier.

With latest silicon technologies, accelerators require a current supply that can vary a lot depending on the requested computation task and on their specific internal architecture. Accelerators are thus often not suitably supplied in current because the limitations imposed to the voltage regulator cannot always comply with the actual current the accelerator needs to properly work, which induces accelerator malfunctions.

Another drawback is that the voltage regulator cannot anticipate the current the accelerator will need to execute the requested computation task. Because the voltage regulator can only supply the accelerator with voltage according to the regulation law, the voltage regulator can fall below the minimum voltage bound needed for the accelerator to properly work, in case of higher current than expected.

Moreover, the voltage regulator can only measure the current flowing through the accelerator at the present time and can therefore not anticipate the future accelerator current needs. It therefore induces a latency when a costly requested computation task is sent to the accelerator while this latter was at rest.

Finally, when the current needed by the accelerator is lower than the maximum current limit, the voltage regulator often supplies an output voltage higher than needed in order to anticipate further current increase due to new requested computation tasks that may be executed. Then, the accelerator works below optimal energy efficiency as soon as maximum current is not used.

Therefore, there is a need for an adapted voltage regulation in an acceleration computing system to supply optimal current and voltage to the accelerator.

BRIEF SUMMARY OF THE INVENTION

An object of at least one embodiment of the invention is to get an acceleration computing system wherein the voltage regulation supplied to the accelerator is optimized.

At least one embodiment of the invention concerns a computing system for adjusting voltage regulation comprising:

A main processing module configured to manage the operation of the computing system;

A secondary processing module configured to execute requested computation tasks sent by the main processing module;

A voltage regulation module comprising an output connected to the secondary processing module and configured to regulate the output voltage according to a regulation law defining a value for the output voltage as a function of at least one regulation parameter;

A first digital bus connecting the main processing module and the secondary processing module, configured to transfer at least one requested computation task from the main processing module to the secondary processing module and to transfer at least one result of the requested computation task from the secondary processing module to the main processing module;

the computing system including:

A second digital bus connecting the voltage regulation module and the main processing module, configured to transfer the at least one regulation parameter depending on the requested computation task from the main processing module to the voltage regulation module.

In one or more embodiments of the invention, the main processing module is able to communicate with the voltage regulation module via the second digital bus. Prior to the execution of a computation task by the secondary processing module, the main processing module can thus send at least one regulation parameter related to the computation task to the voltage regulation module in order to reach the secondary processing module maximum current without voltage drop under the specified minimum voltage bound. The current supplied by the voltage regulation module is therefore optimized for the computation task to be executed by the secondary processing module, which increases the computation performances of the secondary processing module. It also avoids under or overvoltage in the secondary processing module and therefore secondary processing module malfunctions.

A side advantage of at least one embodiment of the invention is to induce minimal effort in secondary processing module software optimization to reduce energy consumption, thanks to the adjustment being achieved by the voltage regulation module in collaboration with the main processing module.

Another advantage of one or more embodiments of the invention is that the voltage regulation module can supply an overvoltage value for a short duration which was not the case in the prior art. In fact, it happens that an optimal regulation may require exceeding the maximum voltage limit during a short period. As a matter of fact, the probability of computation errors is lower, or even neglectable, when the voltage is higher than specified, compared to when the voltage is under the minimal value.

According to at least one embodiment, the at least one regulation parameter is a maximum current limit.

The voltage regulation module can then adjust the current supplied to the secondary processing module according to the received maximum current limit.

According to at least one embodiment, the second digital bus is further configured to transfer at least one voltage value and at least one current value from the voltage regulation module to the main processing module, said voltage value and said current value being measured at the output of the voltage regulation module.

In at least one embodiment of the invention, the main processing module can monitor the voltage and current values supplied by the voltage regulation module to the secondary processing module. For example, the main processing module can monitor the voltage and current values to know when the voltage regulation module has completed the adjustment of the voltage regulation. For example, the main processing module can also monitor the voltage and current values during the execution of the requested computation task to know if the adjusted voltage is optimal with respect to the current needed for the execution of the requested computation task.

According to one or more embodiments, the main processing module and the secondary processing module are embedded on a same board.

According to one or more embodiments, the main processing module is embedded on a first board, and the second processing module and the voltage regulation module are embedded on a second board, the secondary processing module and the voltage regulation module being connected to the main processing module via at least one external plug.

According to at least one embodiment, the secondary processing module is an accelerator In at least one embodiment of the invention, the secondary processing module is a specialized computing architecture dedicated to the execution of one specific task with higher performances than a regular processing module, such as a microprocessor, for example a Field-programmable gate array (FPGA), an Application-Specific integrated circuit (ASIC) or a Graphics processing unit (GPU).

At least one embodiment of the invention includes a method implemented by the computing system according to the invention comprising the following steps:

Reception by the main processing module of a requested computation task and of at least one regulation parameter related to the requested computation task;

Sending by the main processing module via the second digital bus to the voltage regulation module of at the least one regulation parameter;

Adaptation by the voltage regulation module of the regulation law according to the at least one regulation parameter and adjustment by the voltage regulation module of the output voltage according to the adapted regulation law;

Sending by the main processing module via the first digital bus to the secondary processing module of the requested computation task and execution by the secondary processing module of the requested computation task;

Collection via the first digital bus by the main processing module of the result of the requested computation task completed by the secondary processing module.

In one or more embodiments, the main processing module is able to provide at least one appropriate regulation parameter to the voltage regulation module depending on the requested computation task the secondary processing module has to execute. The voltage regulation module is then able to adjust its regulation law according to the at least one regulation parameter received and can then supply the adequate current to the secondary processing module. Consequently, the secondary processing module can process the requested computation task with a suitable current supply, without over or under current and voltage consumption.

At least one embodiment of the invention includes a method for adjusting voltage regulation, characterized in that it comprises the following steps:

Reception by a main processing module of a requested computation task and of at least one regulation parameter related to the requested computation task;

Sending by the main processing module via a second digital bus to a voltage regulation module of the at least one regulation parameter;

Adaptation by the voltage regulation module of a regulation law, defining a value for an output voltage as a function of the at least one regulation parameter, according to the at least one regulation parameter and adjustment by the voltage regulation module of the output voltage according to the adapted regulation law, the output voltage being a voltage at an output of the voltage regulation module;

Sending by the main processing module via a first digital bus to a secondary processing module of the requested computation task and execution by the secondary processing module of the requested computation task;

Application by the voltage regulation module to the output voltage, during execution of the requested computation task, of an overvoltage value for a short duration;

Collection via the first digital bus by the main processing module of the result of the requested computation task completed by the secondary processing module.

According to at least one embodiment of the invention, the at least one regulation parameter is given by a user or is obtained by a development tool of the secondary processing module, said development tool being configured to estimate the regulation parameter for a given requested computation task to be executed on the secondary processing module.

According to at least one embodiment of the invention, the method further comprises a sleeping state step after the collection step wherein the main processing module provides to the voltage regulation module via the second digital bus at least one sleeping state regulation parameter to be applied to the secondary processing module, said at least one sleeping state regulation parameter corresponding to the at least one regulation parameter the secondary processing module needs to enter a minimal working state.

In at least one embodiment, the current supplied to the secondary processing module is adjusted in order to reduce the energy consumption of the computing system when no computation task is to be executed. The at least one regulation parameter provided by the main processing module to the voltage regulation module then corresponds to the at least one regulation parameter needed for the secondary processing module to enter a minimum working state corresponding to a minimal voltage allowing a resumption of activity of the secondary processing module without exceeding the voltage limits.

According to at least one embodiment of the invention, the regulation law of the voltage regulation module is either a linear law or a non-linear law.

According to at least one embodiment of the invention, the method further comprises a first monitoring step during the adjustment step, wherein the main processing module monitors the voltage and the current measured at the output of the voltage regulator module via the second digital bus.

In at least one embodiment, the main processing module knows when the adjustment of the regulation law by the voltage regulation module is done, so that the requested computation task can be sent to the secondary processing module.

According to at least one embodiment, the method further comprises a second monitoring step during the execution step, wherein the main processing module monitors, via the second digital bus, the voltage and the current measured at the output of the voltage regulation module.

In at least one embodiment, the main processing module can therefore know when the requested computation task is done to retrieve the result of the requested computation task.

According to at least one embodiment of invention, the voltage and current values measured at the output of the regulation module are stored by the main processing module.

In at least one embodiment, the voltage and current values can be used to forecast the current needed for further requested computation tasks similar to at least one previously executed computation task.

One or more embodiments of the invention include a computing system configured to implement the method, the computing system comprising:
A main processing module;
A secondary processing module;
A voltage regulation module comprising an output connected to the secondary processing module;
A first digital bus connecting the main processing module and the secondary processing module;
A second digital bus connecting the voltage regulation module and the main processing module.

One or more embodiments of the invention and its various applications will be better understood by reading the following description and examining the accompanying figures.

BRIEF DESCRIPTION OF THE DRAWINGS

The figures are presented for information purposes only and in no way limit the invention.

DETAILED DESCRIPTION OF THE INVENTION

Embodiments of devices and methods in accordance with the invention are now described, by way of example only, and with reference to the accompanying drawings. The description is to be regarded as illustrative in nature and not as restrictive.

One or more embodiments of the invention include a computing system for adjusting voltage regulation.

Figure 1:
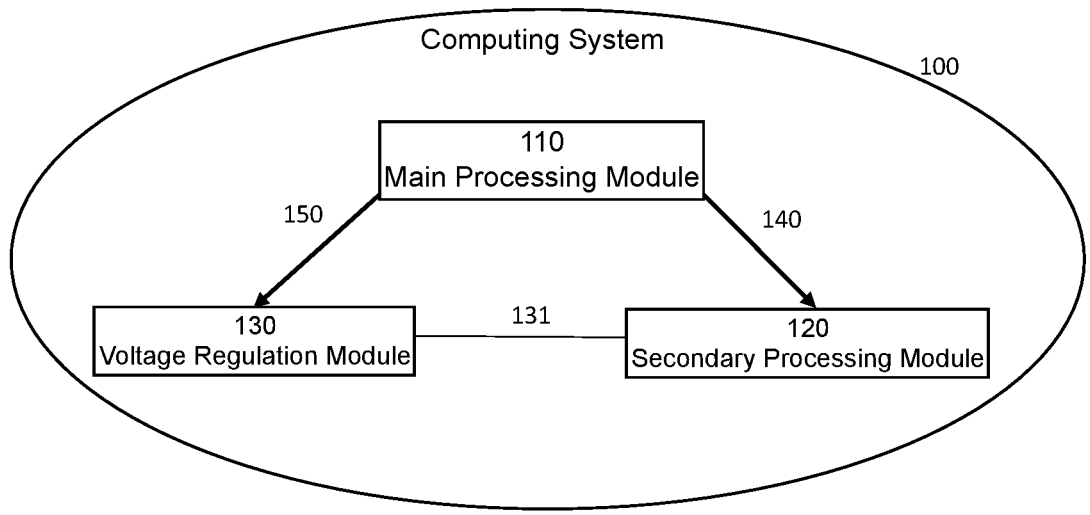
FIG. 1 schematically illustrates a computing system according to one or more embodiments of the invention.

FIG. 1 is a schematic representation of a computing system 100 according to one or more embodiments of the invention.

The computing system 100 comprises at least:
A main processing module 110;
A secondary processing module 120;
A voltage regulation module 130 having an output 131 connected to the secondary processing module 120;
A first digital bus 140 connecting the main processing module 110 and the secondary processing module 120;
A second digital bus 150 connecting the voltage regulation module 130 and the main processing module 110.

The main processing module 110 is configured to manage the operation of the computing system 100.

The main processing module 110 can be a microprocessor.

The main processing module 110 can comprise an operating system, for example a Linux operating system.

The main processing module 110 is configured to receive at least one computation task and to send the received computation task to the secondary processing module 120 for execution.

The secondary processing module 120 is configured to execute the computation task received from the main processing module 110.

The secondary processing module 120 can be a specific processing module dedicated to the computation of one or more specific computation tasks, for example an accelerator that is specialised to execute specific computation tasks faster than the main processing module 110. For example, it can be a Field-programmable Gate Array (FPGA), an Application-Specific Integrated Circuit (ASIC) or a Graphics Processing unit (GPU).

The first digital bus 140 is configured to transfer the computation task from the main processing module 110 to the secondary processing module 120.

The first digital bus 140 is also configured to transfer from the secondary processing module 120 to the main processing module 110 the result of the computation task executed by the secondary processing module 120.

The result can be any data type such as bytes, files, signals or instructions, or any combination thereof. The result type depends on the computation task type.

The first digital bus 140 can be a high bandwidth data bus, for example a PCI-Express bus.

The voltage regulation module 130 is configured to supply, via the output 131, voltage and current to the secondary processing module 120.

The voltage at the output 131 is thereafter called output voltage.

The voltage regulation module 130 can be a power supply unit made with a multi-phase voltage regulator controller and a plurality of power transistors. It can also include at least one digital component to implement more complex algorithms, for example it can implement one or more programmable logic units.

The voltage regulation module 130 supplies the secondary processing module 120 with voltage according to a regulation law. The regulation law defines the voltage evolution as a function of at least one variable.

The variable is for example the current flowing through the voltage regulation module 130, the temperature of the voltage regulation module 130 or a parameter linked to the imperfections of the voltage regulation module 130.

Figure 2:
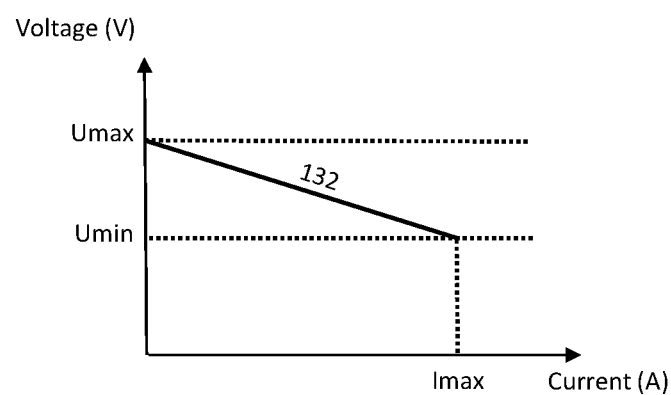
FIG. 2 provides an exemplary regulation law used in a third step of a method according to one or more embodiments of the invention.

FIG. 2 is an example of the regulation law 132 used by the voltage regulation module 130 to adapt the output voltage in order to supply the secondary processing module 120 with a required current, that is the current needed by the secondary processing module 120 to execute the computation task; according to one or more embodiments of the invention.

In FIG. 2, the horizontal axis corresponds to a variation range of current values in Ampère, and the vertical axis to a variation range of voltage values in Volt.

The voltage value of the regulation law 132 is comprised between a maximum voltage value Umax and a minimum voltage value Umin and the current value is limited by a maximum current limit Imax.

The regulation law 132 can either be a linear law, as represented in FIG. 2, or a non-linear law.

The second digital bus 150 is configured to transfer at least one regulation parameter from the main processing module 110 to the voltage regulation module 130.

The at least one regulation parameter is for example a maximum current limit or a temperature.

The second digital bus 150 can also be configured to transfer at least one voltage value and at least one current value from the voltage regulation module 130 to the main processing module 110, said voltage and current value being measured at the output 131 of the voltage regulation module 130.

The second digital bus 150 can be an Inter-Integrated Circuit (I2C) digital bus or any other bidirectional digital bus.

The computing system 100 can comprise at least one storage device connected to the main processing module 110.

The storage device can be a non-volatile memory device such as a hard drive disk or a USB storage device, or a volatile memory storage such as a Random-Access Memory.

The computing system 100 can comprise a network connection, for example it can be a wired connection, such as an Ethernet connection.

The computing system can comprise a display device, such as monitor or a screen.

The computing system 100 can also comprise a user interface, such as a keyboard, a mouse, a touchscreen or any combination thereof.

According to at least one embodiment, the main processing module 110, the secondary processing module 120 and the voltage regulation module 130 are embedded on a same board.

According to at least one embodiment, the main processing module 110 is embedded on a first board and the secondary processing module 120, and preferentially the voltage regulation module 130, are embedded on a second board. The secondary processing module 120 and the voltage regulation module 130 are then connected to the main processing module 110 via at least one external plug. For example, the external plug is a wired connection plug such as Universal Serial Bus (USB) or Ethernet plug, or a wireless connection plug such as Bluetooth or Wifi plug.

In at least one embodiment of the invention, the computing system 100 is comprised in a computer and the secondary processing module 120 is a graphics card of the computer.

One or more embodiments of the invention include a method implemented by the computing system 100.

Figure 3:
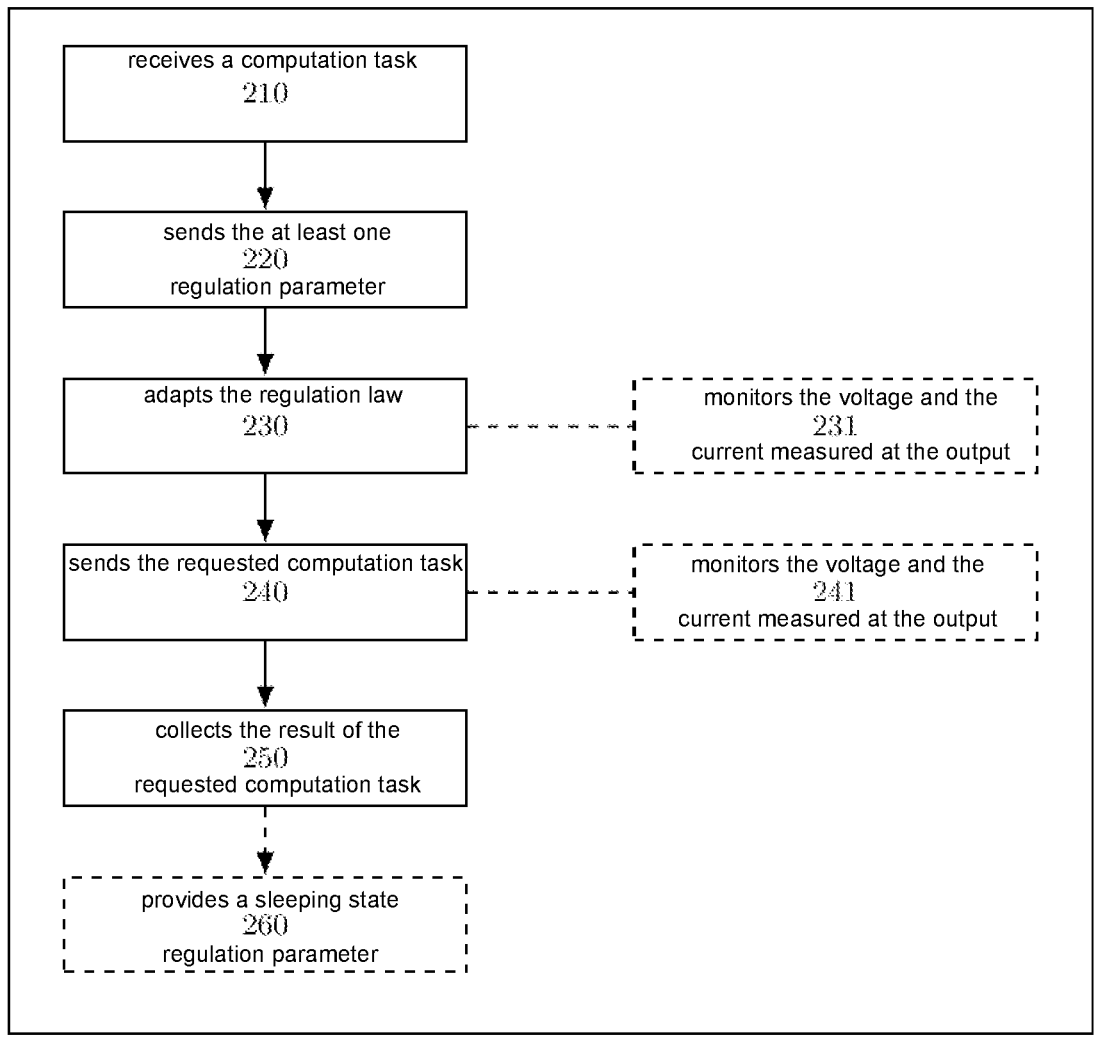
FIG. 3 is a synoptic scheme illustrating the steps of the method according to one or more embodiments of the invention.

FIG. 3 is a synoptic scheme that synthetises the steps of the method 200 according to one or more embodiments of the invention.

The mandatory steps are indicated by rectangle with solid lines and the optional steps are indicated by rectangle with dashed lines.

In a first step 210, the main processing module 110 receives a computation task requested by a user or by an automatic process, and at least one regulation parameter related to the requested computation task.

The at least one regulation parameter can either be given by a user or obtained by a development tool of the secondary processing module 120. The development tool is configured to estimate the at least one regulation parameter for a given requested computation task to be executed on the secondary processing module 120.

The development tool can be made available by the secondary processing module provider 120.

In a second step 220, the main processing module 110 sends the at least one regulation parameter via the second digital bus 150 to the voltage regulation module 130.

In a third step 230, the voltage regulation module 130 adapts the regulation law 132 according to the received at least one regulation parameter and adjusts the output voltage according to the adapted regulation law 132.

By adjustment of the output voltage is meant modifying the voltage value supplied to the secondary processing module 120 to comply with the current required by the secondary processing module 120 to operate, indicated by the at least one regulation parameter received.

The voltage regulation module 130 can preferentially adapt the regulation law 132 by modifying the offset of the regulation law 132. The offset can be the intercept with the vertical axis of the curve of the regulation law 132.

In the case the regulation law 132 is linear, the voltage regulation module 130 can adapt the regulation law 132 by modifying the slope of the regulation law 132. In the case the regulation law 132 is non-linear, the voltage regulation module 130 can adjust the regulation law 132 by modifying the first order derivative of the regulation law 132.

In a sub-step 231 of the third step 230, the main processing module 110 monitors the voltage and the current measured at the output 131 of the voltage regulation module 130 via the second digital bus 150.

The voltage and current at the output 131 of the voltage regulation module 130 are measured by the voltage regulation module 130 and sent to the main processing module 110 via the second digital bus 150.

During sub-step 231, the voltage and current measured at the output 131 of the voltage regulation module 130 can be stored by the main processing module 110 in the storage device.

In a fourth step 240, the main processing module 110 sends the requested computation task received at the first step 210 to the secondary processing module 130 via the first bus 140 and the secondary processing module 130 executes the requested computation task.

In a sub-step 241 of the fourth step 240, the main processing module 110 monitors, via the second digital bus 150, the voltage and the current measured at the output 131 of the voltage regulation module 130.

The voltage and current at the output 131 of the voltage regulation module 130 are measured by the voltage regulation module 130 and sent to the main processing module 110 via the second digital bus 150.

During sub-step 241, the voltage and current measured at the output 131 of the voltage regulation module 130 can be stored by the main processing module 110 in the storage device.

In a fifth step 250, the main processing module 110 collects, via the first digital bus 140, the result of the requested computation task executed by the secondary processing module 120.

In a sixth step 260, the main processing module 110 can provide the voltage regulation module 130 with at least one sleeping state regulation parameter to be applied to the secondary processing module 120 via the second digital bus 150.

The at least one sleeping state regulation parameter corresponds to the at least one regulation parameter the secondary processing module 120 needs to enter a minimal working step.

The at least one sleeping state regulation parameter can be given by the user, by the secondary processing module 120 provider or obtained by the development tool of the secondary processing module 120.

What is claimed is:

1. A method for adjusting voltage regulation, the method comprising:
   receiving, by a main processing module, a requested computation task and at least one regulation parameter related to the requested computation task;
   sending, by the main processing module via a second digital bus, the at least one regulation parameter to a voltage regulation module;
   adapting, by the voltage regulation module, a regulation law,
      wherein the regulation law defines a value for an output voltage as a function of the at least one regulation parameter, according to the at least one regulation parameter;
   adjusting, by the voltage regulation module, the output voltage according to the regulation law that is adapted, wherein the output voltage is a voltage at an output of the voltage regulation module;
   sending, by the main processing module via a first digital bus, the requested computation task to a secondary processing module;
   executing, by the secondary processing module, the requested computation task;
   applying, by the voltage regulation module during said executing of the requested computation task, an overvoltage value for a short duration to the output voltage;
   collecting, by the main processing module via the first digital bus, a result of the requested computation task completed by the secondary processing module.

2. The method according to claim 1, wherein said at least one regulation parameter is given by a user or is obtained by a development tool of the secondary processing module, wherein said development tool is configured to estimate the at least one regulation parameter for a given requested computation task to be executed on the secondary processing module.

3. The method according to claim 1, further comprising a sleeping state after said collecting, wherein the main processing module provides to the voltage regulation module, via the second digital bus, at least one sleeping state regulation parameter to be applied to the secondary processing module, wherein said at least one sleeping state regulation parameter corresponds to the at least one regulation parameter the secondary processing module needs to enter a minimal working state.

4. The method according to claim 1, wherein the regulation law is either a linear or a non-linear law.

5. The method according to claim 1, further comprising monitoring during the adjusting, wherein said monitoring comprises monitoring, by the main processing module, the voltage and a current measured at the output of the voltage regulation module via the second digital bus.

6. The method according to claim 1, further comprising monitoring during the executing, wherein the main processing module, via the second digital bus, monitors the voltage and a current measured at the output of the voltage regulation module.

7. The method according to claim 5, wherein the voltage and the current measured at the output of the voltage regulation module are stored by the main processing module.

8. A computing system configured to implement a method for adjusting voltage regulation, the computing system comprising:
   a main processing module;
   a secondary processing module;
   a voltage regulation module comprising an output connected to the secondary processing module;
   a first digital bus connecting the main processing module and the secondary processing module; and,
   a second digital bus connecting the voltage regulation module and the main processing module;
   wherein said main processing module is configured to receive a requested computation task and at least one regulation parameter related to the requested computation task;
   wherein via the second digital bus, the main processing module is configured to send the at least one regulation parameter to the voltage regulation module;
   wherein the voltage regulation module is configured to adapt a regulation law, wherein the regulation law defines a value for an output voltage as a function of the at least one regulation parameter, according to the at least one regulation parameter;
   wherein the voltage regulation module is configured to adjust the output voltage according to the regulation law that is adapted, wherein the output voltage is a voltage at the output of the voltage regulation module;
   wherein via the first digital bus, the main processing module is configured to send the requested computation task to the secondary processing module;
   wherein the secondary processing module is configured to execute the requested computation task;
   wherein during said execute of the requested computation task, the voltage regulation module is configured to apply an overvoltage value for a short duration to the output voltage;
   wherein via the first digital bus, the main processing module is configured to collect a result of the requested computation task completed by the secondary processing module.

* * * * *